(12) United States Patent
Joos

(10) Patent No.: US 7,415,749 B2
(45) Date of Patent: Aug. 26, 2008

(54) BLOWER

(75) Inventor: Steffen Joos, Murr (DE)

(73) Assignee: Andreas Stihl AG & Co. KG (DE)

( * ) Notice: Subject to any disclaimer, the term of this patent is extended or adjusted under 35 U.S.C. 154(b) by 521 days.

(21) Appl. No.: 10/922,331

(22) Filed: Aug. 20, 2004

(65) Prior Publication Data

US 2005/0039298 A1 Feb. 24, 2005

(30) Foreign Application Priority Data

Aug. 21, 2003 (DE) ................. 103 38 371

(51) Int. Cl.
*A47L 5/14* (2006.01)
(52) U.S. Cl. ............... 15/405; 15/339; 15/344
(58) Field of Classification Search .......... 15/1.51, 15/330, 344, 405, 339, 327.5
See application file for complete search history.

(56) References Cited

U.S. PATENT DOCUMENTS

| | | | | |
|---|---|---|---|---|
| 4,697,300 A | * | 10/1987 | Warlop ................ | 15/327.1 |
| 4,715,085 A | * | 12/1987 | Johanson .............. | 15/339 |
| 4,715,086 A | * | 12/1987 | Johanson et al. ....... | 15/339 |
| 4,866,565 A | * | 9/1989 | Wray, Jr. .............. | 174/47 |
| 5,150,499 A | * | 9/1992 | Berfield ............... | 15/327.1 |
| 2004/0237245 A1 | * | 12/2004 | Wormer ................ | 15/330 |
| 2005/0229556 A1 | * | 10/2005 | Haberlein ............. | 55/360 |
| 2006/0185114 A1 | * | 8/2006 | Joos et al. ............. | 15/330 |

* cited by examiner

*Primary Examiner*—Theresa T Snider
(74) *Attorney, Agent, or Firm*—Robert W. Becker & Assoc; Robert W. Becker

(57) ABSTRACT

A blower is provided, and comprises a blower fan, a motor for driving the fan, a blower tube that extends from the fan, and a potential compensation conductor that extends within the blower tube and is connected with the motor in an electrically conductive manner.

16 Claims, 6 Drawing Sheets

BLOWER

BACKGROUND OF THE INVENTION

The present invention relates to a blower having a blower fan, a motor for driving the fan, and a blower tube that extends from the fan.

With manually guided blowers, by means of a motor-operated fan an air stream is produced that by means of a blower tube that extends from the fan is guided to the desired application. Such blowers are carried, for example, on the back of an operator, and are manually guided, being used for blowing fallen leaves into a pile. The blower can also be used as a spray device, whereby an agent or material that is to be sprayed, such as plant protection material or granulate, is introduced into the blower tube. By means of a venturi device and a collection bag, such a blower can also be used as a nut collector or the like. The housing of the blower fan, the fan wheel, and in particular the blower tube are made of polymeric material, whereby the polymeric material acts as an electrical insulator relative to the drive motor, which forms an electrical ground connection.

At an appropriate fan capacity, a relatively high flow velocity forms in the blower tube. At appropriate atmospheric conditions, and when dirt or dust particle laden ambient air is drawn in, in particular due to friction between the particles as well as with the fan wheel, fan housing and with the blower tube wall, this can lead to electrostatic charges. Contact of components of the blower can result in undesired electrostatic discharges.

It is therefore an object of the present invention to improve a blower of the aforementioned general type in such a way that the formation of an electrostatic charge is prevented.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
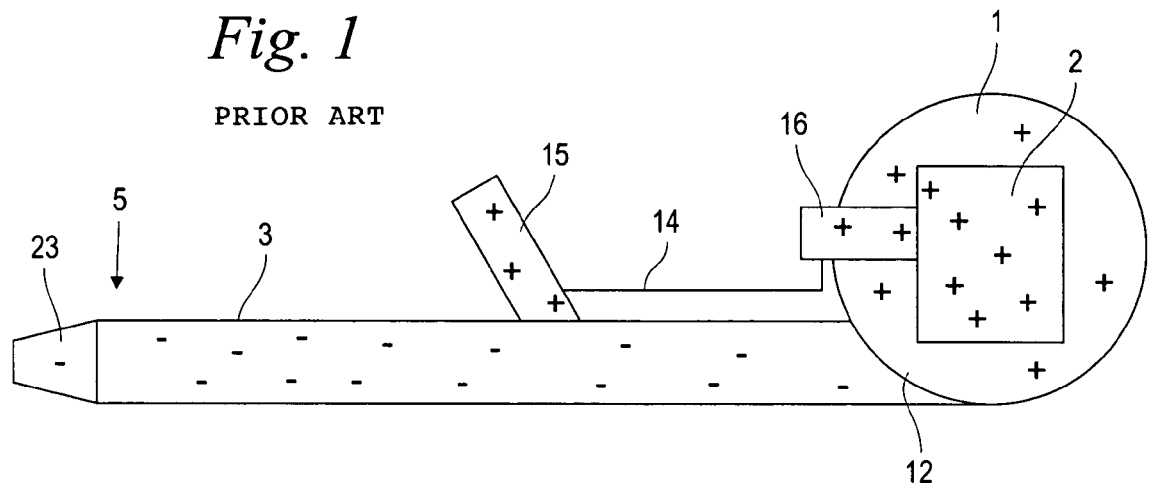
FIG. 1 is a block diagram of the essential components of a blower pursuant to the state of the art.

The present invention proposes a blower having a potential compensation conductor that extends within the blower tube and is connected with the motor in an electrically conductive manner. In this connection, the potential compensation conductor, within the blower tube, receives the charges that result in particular at the dust and dirt particles that are carried along in the air stream, and in an electrically conductive manner equalizes or compensates for the potential difference between the region of the blower tube and the motor. For the conductor lead, no openings through the wall of the blower tube are required. Aerodynamic leaks are avoided.

Pursuant to an advantageous further development, the potential compensation conductor extends from the motor at least into the vicinity of a free end of the blower tube. This embodiment is based on the recognition that an electrostatic charge results from friction over the entire length of the tube. With an appropriately selected length of the potential compensation conductor, the overall developing electrostatic charge can at least nearly completely be conveyed or dissipated to the electrical ground connection or the motor.

Pursuant to an expedient further development, the potential compensation conductor is disposed so as to be unsupported between its two ends. It has been shown that in particular with a flexible configuration of the conductor, the latter can be adapted to the course of the gas flow. With little adverse aerodynamic impact upon the air flow, and low mechanical stressing of the conductor, a reliable charge compensation can be brought about. The manufacturing and assembly cost is low.

To avoid an uncontrolled vibration or flutter of that end that is remote from the motor, the potential compensation conductor is expediently positioned in the blower tube, and in particular radially centrally therein. For this purpose, an embodiment of the appropriate end with an electrically conductive spider has been shown to be expedient. The spider positions or supports the end of the potential compensation conductor via radiating legs against the inner wall of the blower tube. The thin legs can receive electrostatic charges of the particles of the entire flow cross-section without thereby significantly adversely affecting the aerodynamics of the air stream.

For a simple assembly, an arrangement of the legs in a conical shape has shown be to expedient. In this connection, the legs are disposed in particular with a half conical opening angle of a maximum of about 80°. The spider is easy to introduce into the blower tube.

The spider can also advantageously extend at least partially out of the free end of the blower tube. An additional effect of a point discharge at the conductor tips of the spider is achieved, thereby improving the electrostatic dissipation effect.

Pursuant to one advantageous embodiment, the legs of the spider are embodied in an elastically resilient manner, whereby in the relaxed state, an outer diameter of the spider is greater than an inner diameter of the blower tube. Relative to the radial direction, there thereby results an elastically resilient, positive fixing in position of the free end of the potential compensation conductor. The elastic pre-stress leads to a reliable holding, even with vibrations or impacts. By means of the appropriate pressure, a reliable resting of the legs against the inner wall of the blower tube, and hence a good contact, are ensured. Electrostatic charges in this region can be reliably compensated for via the legs and the potential compensation conductor.

Pursuant to an expedient alternative embodiment, in the region of its end that is remote from the motor the potential compensation conductor is positioned via a positioning ring that is disposed transverse to the direction of blowing. The positioning ring can expediently centrally position the spider in the blower tube. With a slightly smaller diameter of the positioning ring relative to the inner diameter of the blower tube, there results an easy assembly and a loose positioning of the free end of the conductor relative to the radial direction. There results a good reception of charge with little aerodynamic and mechanical stress.

The positioning ring advantageously has at least one radially inwardly extending positioning arm, with a snap clamp for the potential compensation conductor. A simplified assembly with high holding force results if the potential compensation conductor is pressed into the snap clamp and is there positively and reliably held. For the simplification of the mounting of the positioning ring, the latter preferably has means, embodied for example as detents, for the positive securement in the blower tube. The detents effect an easy mountability, without tools, with an accurate axial and peripheral positioning, whereby to enhance the peripheral or rotational positioning, the blower tube and the positioning ring can have a cross-sectional shape that deviates from a circular shape, for example being oval.

Pursuant to an advantageous further development, the potential compensation conductor is free of electrical insulation at least nearly over its entire length. In this connection, the potential compensation conductor can, directly at the location where it occurs, compensate for the electrostatic charge that forms over the travel length of the air stream. The formation of individual regions having no potential compensation is avoided.

An embodiment of the potential compensation conductor as a flexible wire structure, and in particular as a stainless steel wire, has shown to be expedient. A reliable potential compensation with little mechanical sensitivity against abrasive effects from the dust particles or the like carried along in the air stream results.

Pursuant to an advantageous further development, in the region of the end that is remote from the motor individual strands of the steel wire are untwisted and are bent radially outwardly to form the spider. The geometrically complex structure of potential compensation conductor and spider can, in a surprisingly easy manner, be monolithically produced from a twisted steel wire with little manufacturing expense.

The steel wire is advantageously embodied in such a way that under the effect of a cut, its strands automatically untwist. Such a steel wire is also designated as not being resistant to sectioning, whereby upon cutting the potential compensation conductor to length from a continuous steel wire material, the individual strands automatically untwist as a result of the sectioning or cutting that is to be carried out for cutting the material to length. The untwisting can be stopped at a prescribed point, for example by means of a previously applied clamping sleeve, in such a way that the untwisted strand ends automatically untwist into the desired spider shape up to the clamping sleeve without any additional steps.

In the region of its free end that adjoins the spider, the potential compensation conductor is advantageously covered by a hose of polymeric material, in particular by a shrunk-on hose, that expediently extends to over the squeezing sleeve in the center of the spider. The hose reduces the rigidity difference of the clamped-in conductor, and thus prevents a breaking of the conductor at the end of the clamping into the positioning ring.

The potential compensation conductor expediently extends on the inside through a discharge bend or knee of the blower fan, whereby the end of the potential compensation conductor that is near the motor can be fixed in position on the motor, within the blower fan, in the region of the discharge knee, in particular via a motor mounting bolt. Also in this region no opening through the fan housing is necessary for the compensation conductor. Also in the region of the discharge knee the compensation conductor can contribute to potential compensation. By means of the motor mounting bolt that is present with known devices and extends into the discharge knee, a reliable grounding results without any additional expense.

Pursuant to an advantageous embodiment, the potential compensation conductor has a two-part construction, formed from two pieces, whereby a connecting element, in particular in the form of a carabiner hook or spring clip, is provided for the two pieces. A separation location between the two pieces is expediently disposed at least approximately in the region of a separation location between the blower tube and the discharge knee. The two pieces of the potential compensation conductor can respectively be mounted separately in the blower tube or in the motor housing, and can be separately packaged as finished subassemblies. The motor housing can be subjected to a functional control without a blower tube connected thereto. For transport, the user can easily separate the blower tube from the discharge knee, whereby at the same location a separation of the potential compensation conductor can also be undertaken. In preparation for operating the blower, the two subassemblies can easily be interconnected, as a result of which, without limiting the function, an easy transportability or storability results.

Further specific features of the present invention will be described in detail subsequently.

DESCRIPTION OF SPECIFIC EMBODIMENTS

Referring now to the drawings in detail, the schematic block diagram of FIG. 1 shows the essential components of a manually guided blower according to the state of the art. The blower has a blower fan 1, which is driven by a motor 2. In the illustrated embodiment, the motor 2 is an internal combustion engine having an indicated carburetor 16. An electric motor or the like can also be provided. The blower fan 1 is provided with a discharge bend or knee 12, which is adjoined by a blower tube 3 that continues from the blower fan 1. The blower tube 3 has a free end 5, on which is disposed a nozzle 23. An air stream is conveyed out of the blower fan 1 through the discharge knee 12 and from there is conveyed through the blower tube 3 and the nozzle 23.

Mounted on the outer side of the blower tube 3 is a handle or hand grip 15 having control elements for the motor 2. A gas lever or cable 14, for example, leads from the control elements on the hand grip 15 to the carburetor 16. The gas cable 14 is electrically conductive, as a result of which the hand grip 15 as well as the motor 2 with the carburetor 16 have the same electrical potential. Due to friction of the particles that are carried along in the air stream relative to one another as well as with the walls of the discharge knee 12 and of the blower tube 3, there results in this region a negative electrostatic charge, which is indicated by minus signs. In contrast, the region of the motor 2 and of the hand grip 15 have a positive potential difference, which is indicated by plus signs. The negatively charged particles leave the blower tube 3 through the nozzle 23, as a consequence of which the positive charge of the motor 2 continuously increases during operation of the unit.

It has been shown that in particular in the hand grip 15, such a high potential difference between the gas cable 14 and the hand of the operator can result that an undesired electrical discharge is obtained.

FIG. 2 shows the inventive further development of the arrangement of FIG. 1, according to which a potential compensation conductor 4, which is connected in an electrically conductive manner to the motor 2, extends on the inside of the blower tube 3. One end 6 of the potential compensation conductor 4 is disposed in the region of the free end 5 of the blower tube 3, and its opposite end 7 is fixed in position in an electrically conductive manner on the motor 2 via a motor mounting bolt 13. At its end 6 that is disposed remote from the motor 2, the potential compensation conductor 4 is centrally positioned in the blower tube 3 via an electrically conductive spider 8. Between its two ends 6, 7, the potential compensation conductor 4 runs in an unsupported manner. In the region of its end 6, the potential compensation conductor 4 can also be screwed, riveted, or otherwise fixed in position or supported in some other suitable manner on or with the wall of the blower tube 3. Over their entire length, the potential compensation conductor 4 and the spider 8 have a plain or bare electrically conductive surface.

When an air stream is formed in the blower tube 3, the electrostatic charge that results along the blower tube 3 is received over the entire length of the potential compensation conductor 4 and is compensated for by the electrical contact with the motor 2. A final charge reception from the air stream is effected via the electrically conductive spider 8. In this connection, the spider 8 receives electrostatic charges not only from the air stream over the entire cross-sectional area thereof, but also from the inner walls of the blower tube 3. The potential compensation conductor 4, which extends in an unsupported manner between its two ends 6, 7, can be disposed in the blower tube 3 and in the discharge knee 12 in any desired manner, for example linearly or in a curved manner, whereby it receives electrostatic charges not only from particles in the air stream but also when it appropriately rests against the inner walls of the blower tube 3.

The blower tube 3 is detachably inserted into the discharge knee 12 at a separation location 32. In the region of the separation location 32, the potential compensation conductor 4 is also provided with a detachable separation location 31.

In the illustrated arrangement, the motor 2 and the carburetor 16 serve as an electrical ground connection, whereby via the potential compensation conductor 4 no or at most a slight potential difference, indicated by plus and minus signs, results. Instead of the motor 2 or the carburetor 16, a metal housing or some other suitable ground connection can also be provided. For this purpose, for example, with power line-operated blowers the ground wire of the power cable is suitable.

The illustrated blower is provided for blowing leaves or the like into a pile, and can also be used as a suction device. As an option, an injector 34, which is indicated by dashed lines, can be provided on the blower tube 3. The blower is thus turned into a sprayer for plant protection material or the like, by introducing material that is to be sprayed into the blower tube 3 via the injector 34 and spraying it via the blower tube 3. The illustrated arrangement can also be embodied as a nut harvester that will be described in greater detail in conjunction with FIG. 4.

FIG. 3 shows a variation of the arrangement of FIG. 2, according to which the potential compensation conductor 4 is guided through the blower tube 3 to the free end 5 thereof. At the end 6 of the potential compensation conductor 4, a spider 8 is provided in such a way that the end 6 is disposed in the center of the spider 8 within the blower tube 3, while the conductor tips of the spider 8 extend out of the free end 5 of the blower tube 3. With regard to the remaining features, the illustrated arrangement coincides with the embodiment of FIG. 2.

FIG. 4 shows a variation of the arrangement of FIG. 2 in a configuration as a nut harvester. The free end of the blower tube 3 opens into a collection bag 35. By means of a central intake opening 36 of the blower fan 1, and a suction tube that is connected thereto and is not shown in greater detail, an air stream can be drawn in and can be conveyed via the blower tube 3 into the collection bag 35. By means of a non-illustrated suction device, for example in the form of a venturi device, which opens into the blower tube 3, nuts, olives or the like can be gathered up from the ground via suction and can be blown into the collection bag 35.

Extending within the blower tube 3 is the potential compensation conductor 4, which is connected with the motor 2 in an electrically conductive manner. The potential compensation conductor 4 connects an inner potential compensation device 37 of the collection bag 35 in an electrically conductive manner with an electrical ground connection 39 of the suction/blower device. In the illustrated embodiment, the potential compensation device 37 is formed by an electrically conductive fabric of the collection bag 35, which has woven-in, metallically conductive threads. A conductive foil coating or the like can also be provided.

In the illustrated embodiment, the electrical ground connection 39 is formed by the motor 2. For this purpose, it would also be possible, for example, to use the ground wire of an electrical drive motor or the like. Provided within the blower tube 3 is a further potential compensation device 38 that is connected via the potential compensation conductor 4 with the potential compensation device 37 of the collection bag 35, and with the electrical ground connection 39, in an electrically conductive manner. In the illustrated embodiment, the potential compensation conductor 4 is centrally positioned in the blower tube 3 via radially projecting wires of an electrically conductive spider 8. The further potential compensation device 38 is formed by the spider 8 and the bare potential compensation conductor 4.

When an air stream is formed in the blower 3, the electrostatic charge that results along the blower tube 3 is received over the entire length of the potential compensation conductor 4 and is compensated for by the electrical contact with the motor 2. A further charge reception from the air stream is effective via the electrically conductive spider 8. In this connection, the spider 8 receives electrostatic charges not only from the air stream over the entire cross-sectional area thereof, but also from the inner walls of the blower tube 3. The remaining electrical charges are conducted away, in a controlled manner, via the potential compensation conductor 4 to the electrical ground connection 39. With regard to the remaining features and reference numerals, the illustrated embodiment coincides with that of FIG. 2.

The side view of FIG. 5 shows details of the arrangement of FIGS. 2 and 4 in the region of the blower fan 1. In the illustrated embodiment, the fan 1 is embodied as a radial-flow fan having a spiral shaped fan housing. Shown of the fan housing is the inner side of a half shell 17 in which an indicated fan wheel 18 can be rotatably driven about an axis of rotation 19 via the motor 2. The spiral fan housing merges via a discharge bend or knee 12 into the indicated blower tube 3.

The motor 2 is disposed on the back side of the half shell 17 and is fixed in position by means of motor mounting bolts 13 that extend through the end wall of the half shell 17. The potential compensation conductor 4 extends on the inside through the discharge knee 12 of the blower fan 1 and within the fan 1, in the region of the discharge knee 12, at the corresponding motor mounting bolts 13 disposed at that location, is connected with the motor 2 in an electrically conductive manner.

Figure 5:
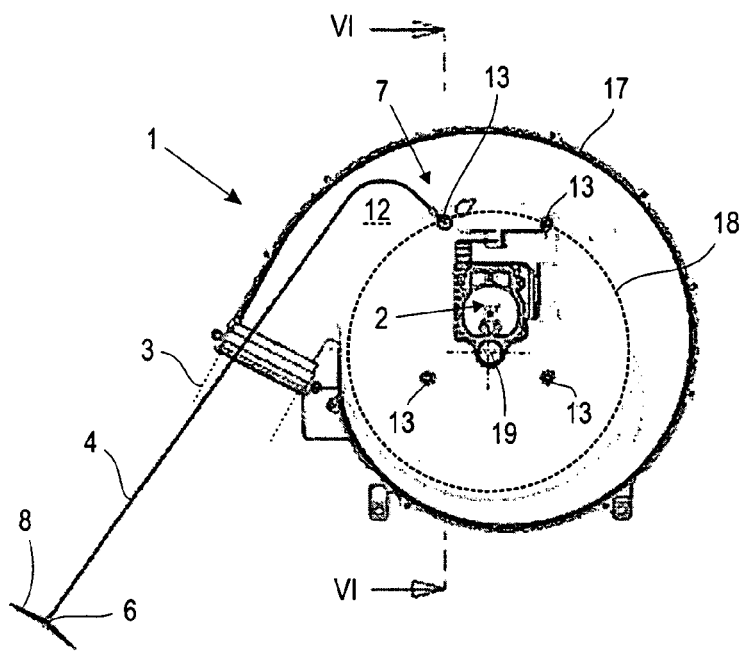
FIG. 5 shows details of the fan housing of the arrangement of FIGS. 2 and 4.
Figure 6:
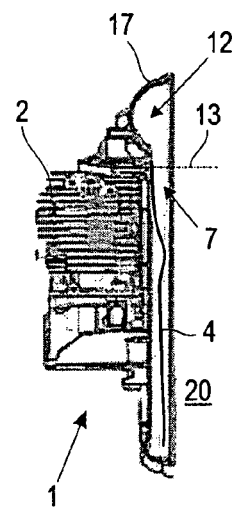
FIG. 6 is a cross-sectional view of the arrangement of FIG. 5.

FIG. 6 shows a cross-sectional view of the arrangement of FIG. 5, with the section being taken along the line VI-VI. The motor 2 is fixed in position on the outer side of the half shell 17 via the motor mounting bolts 13, which extend through the side wall of the half shell 17.

On the inside 20 of the fan housing that is opposite the motor 2 an air stream forms during operation that extends through the discharge knee 12 and from there through the blower tube 3 (FIG. 5). In the region of its end 7, the potential compensation conductor 4 is disposed on the inside 20 of the fan 1, and at that location, in the region of the discharge knee 12, can be screwed or bolted via the motor mounting bolts 13 in an electrically conductive manner with the motor 2 that is disposed on the outside.

Figure 2:
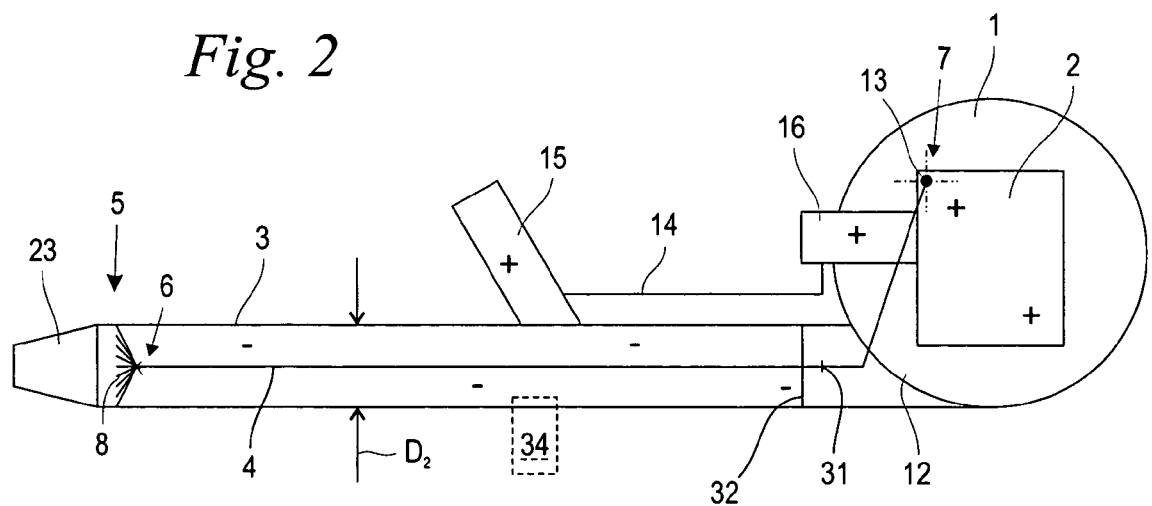
FIG. 2 shows the arrangement of FIG. 1 with one exemplary embodiment of a potential compensation conductor that extends through the blower tubes.
Figure 3:
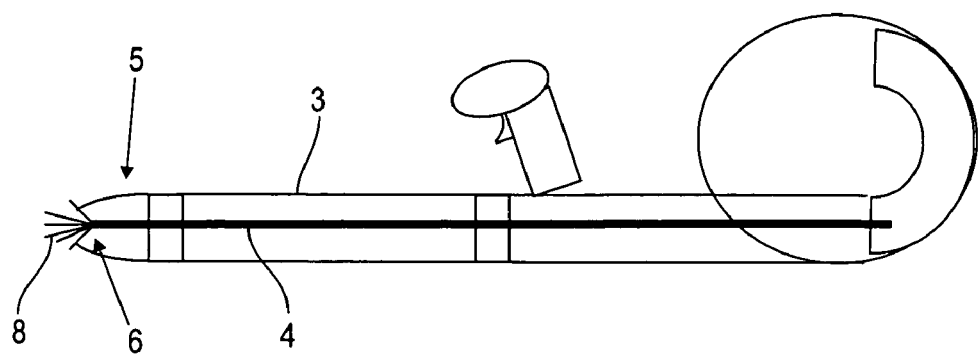
FIG. 3 shows a variation of the arrangement of FIG. 2 having a potential compensation conductor that extends out of the free end of the blower tube.
Figure 4:
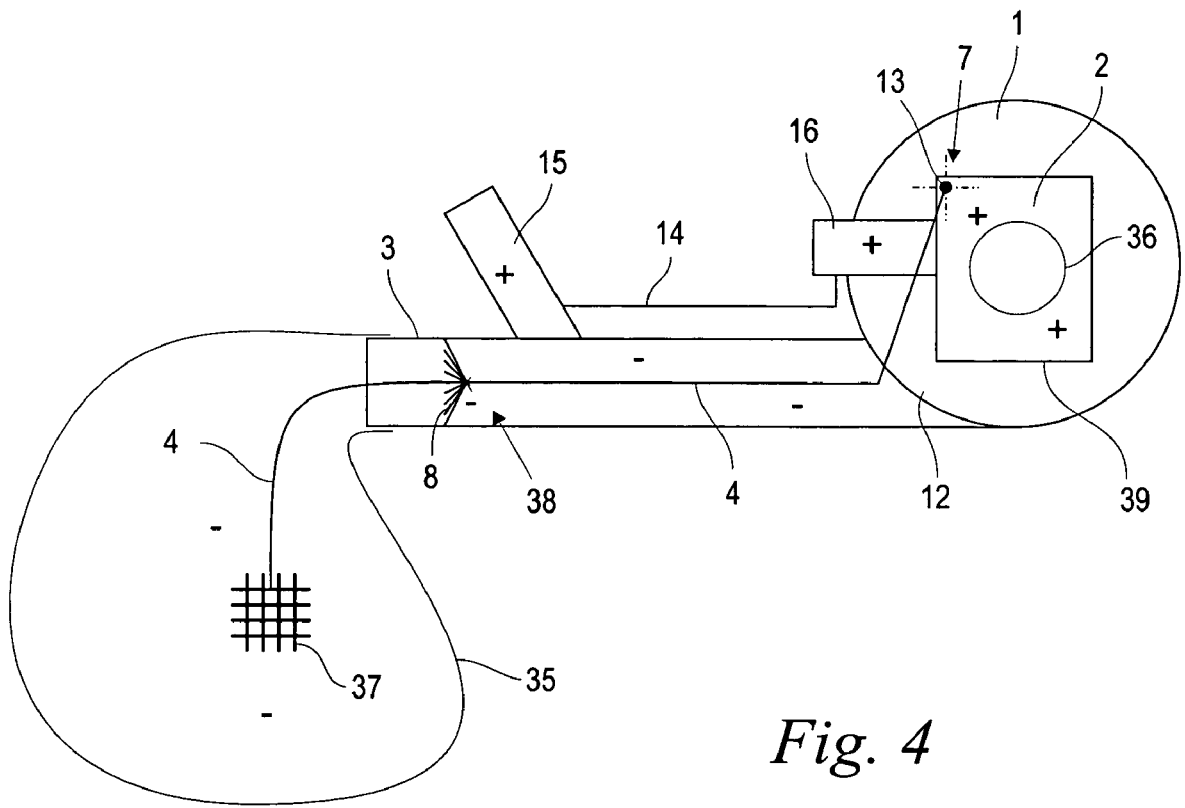
FIG. 4 shows an embodiment of the arrangement of FIG. 2 in a configuration as a nut harvester.
Figure 7:
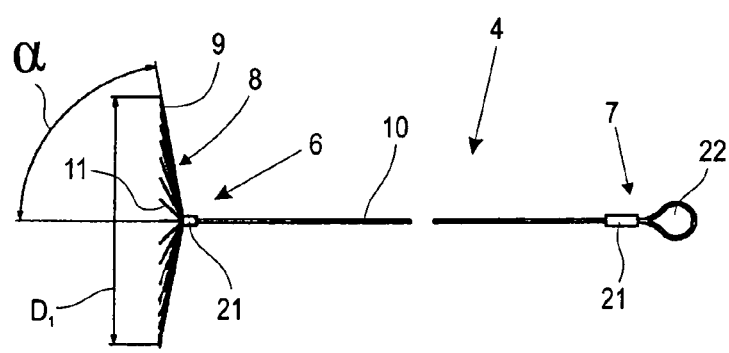
FIG. 7 shows details of the potential compensation conductor with a spider and a securement eye.

FIG. 7 shows details of the potential compensation conductor 4 of FIGS. 2 to 6. The potential compensation conductor 4 can be a rigid wire, a metallic foil band, a flat metallic fabric, or the like. It would also be possible to use electrically conductive synthetic materials, especially carbon-containing material. In the illustrated embodiment, the potential compensation conductor is embodied as a flexible stainless steel wire 10 having a number of twisted strands 11. In the region of its end 7 on the motor side, the steel wire 10 is formed into an eye 22 and is held via a squeezing sleeve 21. The eye 22 is provided for coupling with the motor mounting bolts 13 (FIGS. 2 to 4). A cable shoe or similar terminal can also be provided on the end 7 on the motor side.

Provided at the opposite end 6 of the potential compensation conductor 4 is a further squeezing sleeve 21, beyond which the strands 11 of the steel wire 10 are untwisted and are bent radially outwardly in a conical fashion. In the illustrated embodiment, the conical shape of the bent-out strands 11 has a half conical angle $\alpha$ of about 80°. A smaller half conical opening angle $\alpha$ can also be expedient.

In the illustrated embodiment, the steel wire 10 has nineteen individual strands 11 that in the conically shaped bent-out region form elastically resilient legs 9 of a spider 8. Separate or additional legs 9 can also be provided. The spider 8 has an outer diameter $D_1$ that in the illustrated unstressed state is greater than an inner diameter $D_2$ of the blower tube 3 (FIG. 2). There results a resiliently pre-stressed abutment of the legs 9 against the inner wall of the blower tube 3.

Figure 8:
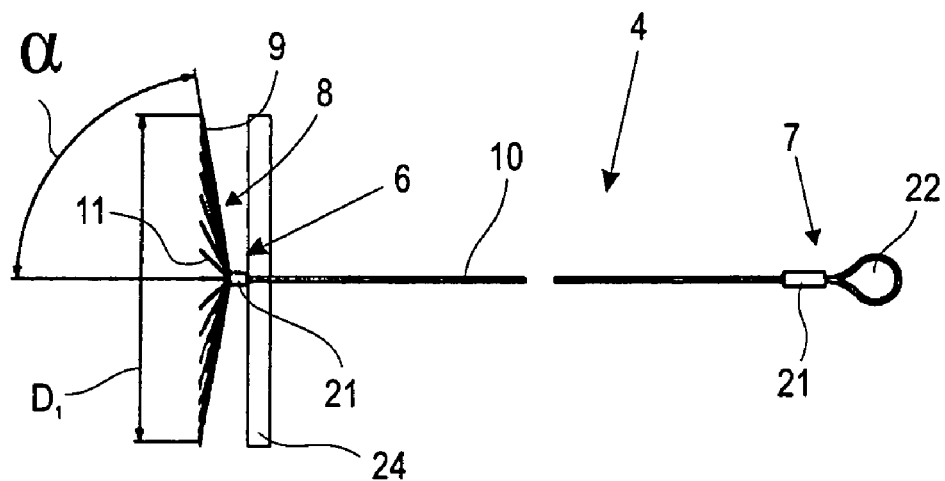
FIG. 8 shows a variation of the potential compensation conductor of FIG. 7 with a positioning ring.
Figure 9:
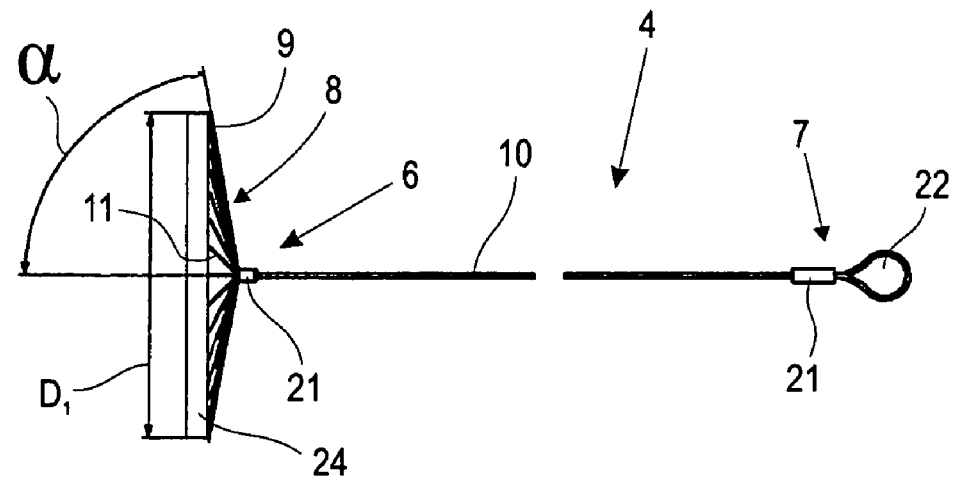
FIG. 9 shows a further variation of the potential compensation conductor of FIGS. 7 and 8 with a positioning ring that holds the ends of the spider legs.

In the alternative embodiment of FIG. 8, a positioning ring 24 is provided on the potential compensation conductor 4 in the region of the free end 6 and upstream of the spider 8. In the further embodiment of FIG. 9, the positioning ring 24 extends about the spider on the outer side. In this connection, the ends of the legs 9 are fixed in position on the positioning ring 24. In the embodiments of FIGS. 8 and 9, the spider 8 and positioning ring 24 have an outer diameter $D_1$ that is less than the inner diameter $D_2$ of the lower tube 3 (FIG. 2). In this connection, the free end 6 of the potential compensation conductor 4 is positioned, with radial play, approximately centrally in the blower tube 3. With regard to the remaining features and reference numerals, the embodiments of FIGS. 8 and 9 coincide with that of FIG. 7.

Figure 10:
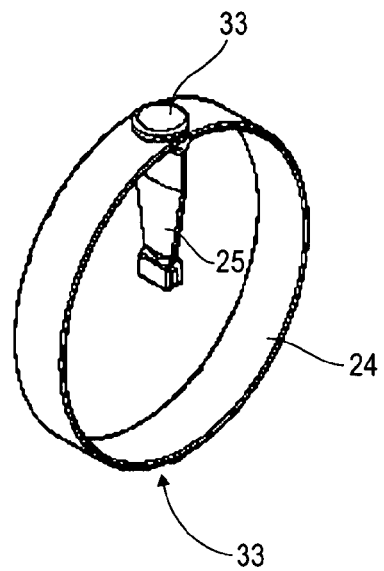
FIG. 10 is a perspective illustration of the positioning ring of FIG. 8.

The positioning ring 24 of FIG. 8 is shown in a perspective view in FIG. 10. The positioning ring 24 has a radially inwardly extending positioning arm 25 for holding the potential compensation conductor 4 (FIG. 8). Upon the radial outer side, two diametrically oppositely disposed detents 33 are provided that catch in appropriate, non-illustrated arresting openings of the blower tube 3 (FIG. 2), thereby effecting a positive fixing in position of the positioning ring 24 in the blower tube 3 not only in the peripheral direction but also in the axial direction.

Figure 11:
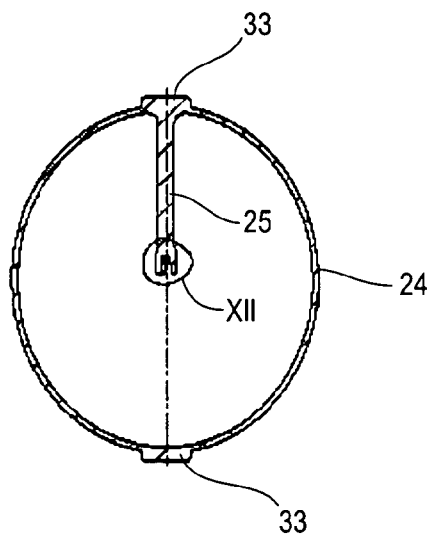
FIG. 11 is a cross-sectional view of the positioning ring of FIG. 10.

FIG. 11 shows a cross-sectional view of the positioning ring 24 of FIG. 10, according to which the positioning ring 24 has an elliptical cross-sectional shape that deviates from the circular shape. In this connection, the two detents 33 are disposed across from one another in the direction of the longest axis of the elliptical shape.

Figure 12:
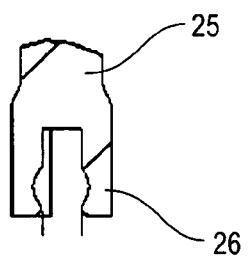
FIG. 12 shows the encircled detail XII of FIG. 11 with an enlarged snap clamp for the potential compensation conductor.

The enlarged view of FIG. 12 shows the encircled detail XII of FIG. 11, according to which a snap clamp 26 is provided on the free end of the positioning arm 25. The snap clamp 26 is centrally disposed, relative to the cross-sectional shape of the positioning ring 24 (FIG. 11), and is provided for the arresting, positive securement of the potential compensation conductor 4 (FIG. 8) coaxially relative to the blower tube 3 (FIG. 2).

Figure 13:
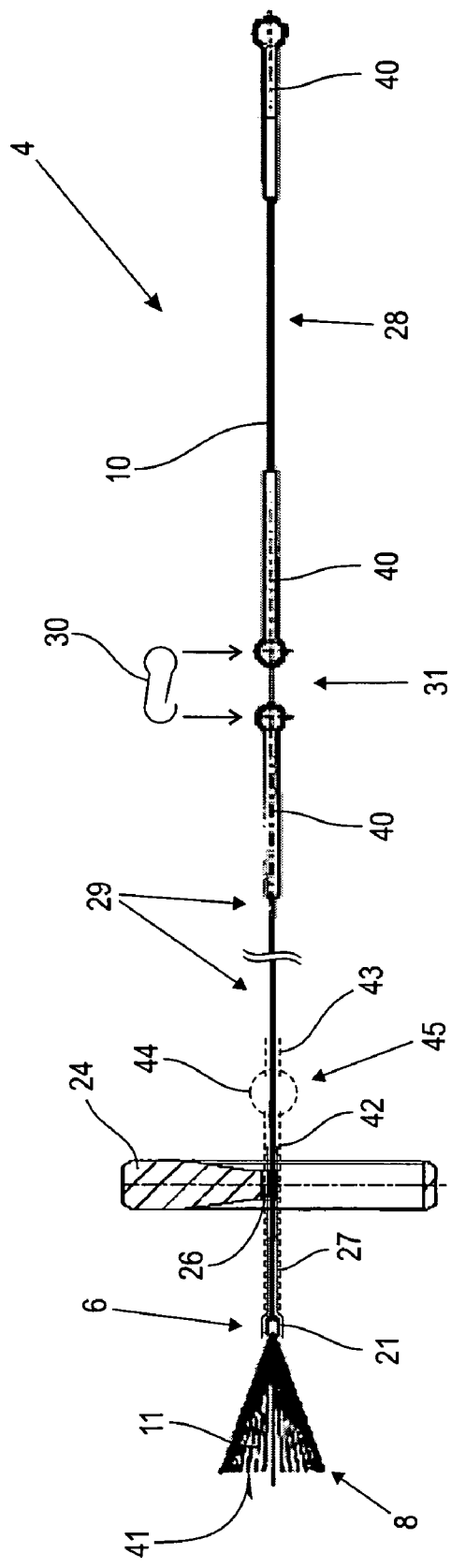
FIG. 13 is a composite illustration of the split potential compensation conductor of FIG. 2 with the positioning ring of FIGS. 10 to 12.

The composite illustration of FIG. 13 shows the two-part compensation conductor 4 of FIG. 2 together with the positioning ring 24. At the separation location 31, the potential compensation conductor 4 is split into two parts in such a way that two pieces 28, 29 are formed. At their facing ends, the two pieces 28, 29 are provided with a pressed-on annular sleeve 40 through which a carabiner hook 30 is guided for the detachable connection of the two pieces 28, 29. In place of the carabiner hook 30, other suitable connecting elements could also be provided, by means of which an electrically conductive and releasable rapid connection of the two pieces 28, 29 is made possible. At its free end, the piece 28 is provided with a further pressed-on annular sleeve 40, by means of which it can be fixed in position on the motor mounting bolt 13 in accordance with FIG. 2.

In the region of the free end 6, at a distance from a sectional plane 41, the squeezing sleeve 21 is placed and pressed onto the piece 29. At the conclusion of the pressing process of the sleeve 21, the second piece 29, which is made of a continuous material of the steel wire 10, is cut to length at the sectional plane 41. The nature of the steel wire 10 is such that its strands 11, under the effect of this cutting, automatically untwist to form the spider 8. In this connection, the squeezing sleeve 21 acts as a stop element for the automatic untwisting process, and is disposed centrally in the spider 8.

In the region of its free end 6 that adjoins the spider 8, the potential compensation conductor 4 is covered by a hose of polymeric material, which in the illustrated embodiment is embodied as a shrunk-on hose 27. The hose 27 is guided through the positioning ring 24, and together with the second piece 29 is held in the snap clamp 26. In the opposite direction, the shrunk-on hose 27 is guided in a protecting manner to over the squeezing sleeve 21 to cover the same.

Instead of the safeguarding against breaking being provided by means of the shrunk-on hose 27, alternatively a pivoted or articulated design can be provided, which is indicated by dashed lines in FIG. 13. For this purpose the piece 29 has a separation location 45 that is provided close to the positioning ring 24 on that side that is opposite the spider 8. Instead of the squeezing sleeve 21 and the shrunk-on hose 27, a rigid annular sleeve 42 is provided that is pressed or crimped on, and that extends from the spider 8, i.e. from the free end 6 of the potential compensation conductor 4, to the separation location 45. In conformity with the previously described squeezing sleeve 21, the annular sleeve 42 centrally holds the strands 11 of the spider 8 together. Furthermore, the annular sleeve 42, which is illustrated in dashed lines, is clipped into position in the snap clamp 26 of the positioning ring 24.

Provided on that side of the separation location 45 that is opposite the positioning ring 24 is a further annular sleeve 43 that is pressed or crimped onto the piece 29. Drawn through the facing eyes of the two annular sleeves 42, 43 is a ring 44 that pivotably connects the two halves of the piece 29 of the potential compensation conductor 4 in the separation location 45 thereof. The pivotable or articulated connection in the separation location 45 leads to a mechanical uncoupling of the portion of the potential compensation conductor 4 on the motor side from the region of the spider 8 or the positioning ring 24 in such a way that the region of the potential compensation conductor 4 disposed on the motor side of the separation location 45 can move, be oriented, or swing freely without there being any danger of the formation of folds or kinks. Nonetheless, by means of the metallic ring 44 an electrically conductive connection is ensured over the entire length of the potential compensation conductor 4.

The specification incorporates by reference the disclosure of German priority document DE 103 38 371.9 filed Aug. 21, 2003.

The present invention is, of course, in no way restricted to the specific disclosure of the specification and drawings, but also encompasses any modifications within the scope of the appended claims.

The invention claimed is:

1. A blower comprising:
a blower fan,
a motor for driving said blower fan,
a blower tube that extends from said blower fan, and
a potential compensation conductor that extends within said blower tube, wherein said potential compensation conductor is connected with said motor in an electrically conductive manner, wherein said potential compensation conductor is disposed in an unsupported manner between two ends thereof.

2. A blower comprising:
a blower fan,
a motor for driving said blower fan,
a blower tube that extends from said blower fan, and
a potential compensation conductor that extends within said blower tube, wherein said potential compensation conductor is connected with said motor in an electrically conductive manner, wherein an end of said potential compensation conductor that is remote from said motor is positioned centrally, especially radially centrally, in said blower tube.

3. The blower according to claim 2, wherein an electrically conductive spider having radiating legs is provided on that end of said potential compensation conductor that is remote from said motor.

4. The blower according to claim 3, wherein said legs are disposed in a conical manner and in particular have a half cone opening angle of a maximum of about 80°.

5. The blower according to claim 3, wherein said spider extends at least partially out of a free end of said blower tube.

6. The blower according to claim 3, wherein said legs are elastically resilient, and wherein an outer diameter of said spider, in a relaxed state, is greater that an inner diameter of said blower tube.

7. The blower according to claim 2, wherein a positioning ring is provided that is disposed transverse to a direction of blowing, and wherein said potential compensation conductor, in the region of its end that is disposed remote from said motor, is positioned by means of said positioning ring.

8. The blower according to claim 7, wherein said positioning ring is provided with at least one radially inwardly extending positioning arm that has a snap clamp for said potential compensation conductor.

9. The blower according to claim 7, wherein said positioning ring is provided with means, especially in the form of detents, for a positive securement in said blower tube.

10. The blower according to claim 7, wherein an electrically conductive spider having radiating legs is provided at that end of said potential compensation conductor that is remote from said motor, and wherein ends of said legs are held on said positioning ring.

11. A blower comprising:
a blower fan,
a motor for driving said blower fan,
a blower tube that extends from said blower fan, and
a potential compensation conductor that extends within said blower tube, wherein said potential compensation conductor is connected with said motor in an electrically conductive manner, wherein said potential compensation conductor is in the form of a flexible wire structure, in particular a stainless steel wire, and wherein in the region of an end that is remote from said motor, individual strands of said steel wire are untwisted and are bent radially outwardly to form a spider.

12. The blower according to claim 11, wherein said strands of said steel wire are self-untwisting under the effect of a cut.

13. The blower according to claim 11, wherein in the vicinity of a free end thereof that adjoins said spider, said potential compensation conductor is covered by a hose of polymeric material, especially a shrunk-on hose, that expediently extends to over a squeezing sleeve provided in a center of said spider.

14. A blower comprising:
a blower fan,
a motor for driving said blower fan,
a blower tube that extends from said blower fan, and
a potential compensation conductor that extends within said blower tube, wherein said potential compensation conductor is connected with said motor in an electrically conductive manner, wherein said potential compensation conductor extends within and through a discharge knee of said blower fan, and wherein within said blower fan, in the region of said discharge knee, an end of said potential compensation conductor that is close to said motor is fixed in position on said motor, in particular via a motor mounting bolt.

15. A blower comprising:
a blower fan,
a motor for driving said blower fan,
a blower tube that extends from said blower fan, and
a potential compensation conductor that extends within said blower tube, wherein said potential compensation conductor is connected with said motor in an electrically conductive manner, wherein said potential compensation conductor is divided into two pieces, and wherein a connecting element, in particular in the form of a carabiner hook, is provided for said two pieces.

16. The blower according to claim 15, wherein a separation location between said two pieces is disposed at least approximately in the region of a separation location that is provided between said blower tube and a discharge knee of said blower tube.

* * * * *